Oct. 8, 1929.  M. SCHULZ  1,730,438

CIGAR CUTTER

Filed Dec. 18, 1928

Inventor
Max Schulz
By his Attorney

Patented Oct. 8, 1929

1,730,438

UNITED STATES PATENT OFFICE

MAX SCHULZ, OF BROOKLYN, NEW YORK

CIGAR CUTTER

Application filed December 18, 1928. Serial No. 326,714.

This invention relates to a device for properly cutting off the ends of cigars.

As is well known, it is necessary that a cigar be cut at one end before it may be satisfactorily smoked, but heretofore the ends of cigars have been cut by penknives, or by crude, manually operated devices.

It is an object of this invention to provide a device for cutting the ends of cigars properly, which device may be operated by an electric motor.

A further object of the invention is the provision of a simple and compact cigar cutter which may be manufactured at a low cost, and be capable of constant operation.

These and other objects are attained by the novel construction, combination and arrangement of parts hereinafter described and shown in the accompanying drawing, constituting a material part of this disclosure, and in which.

Figure 1:
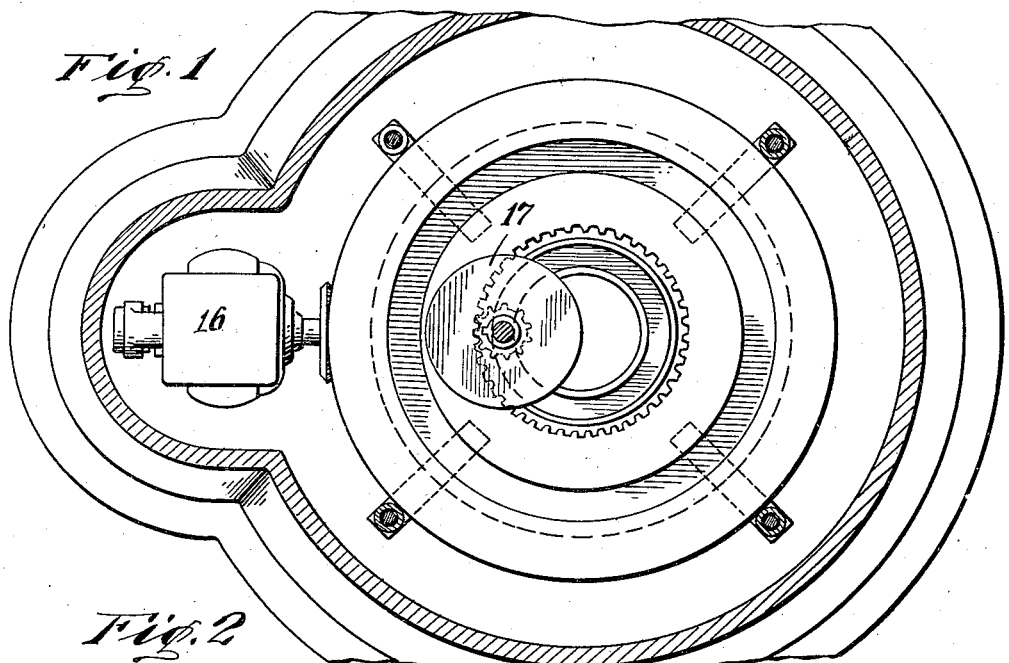
Figure 1 is a view taken on line 1—1 of Figure 2.
Figure 2:
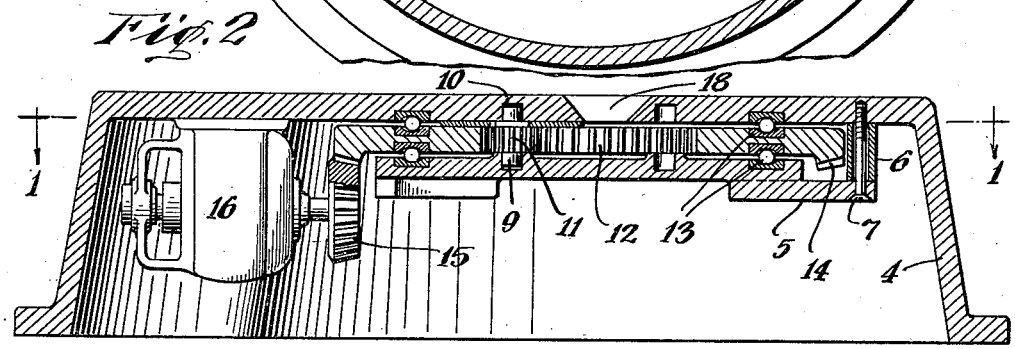
Figure 2 is a cross-sectional side view of the device.
Figure 3:
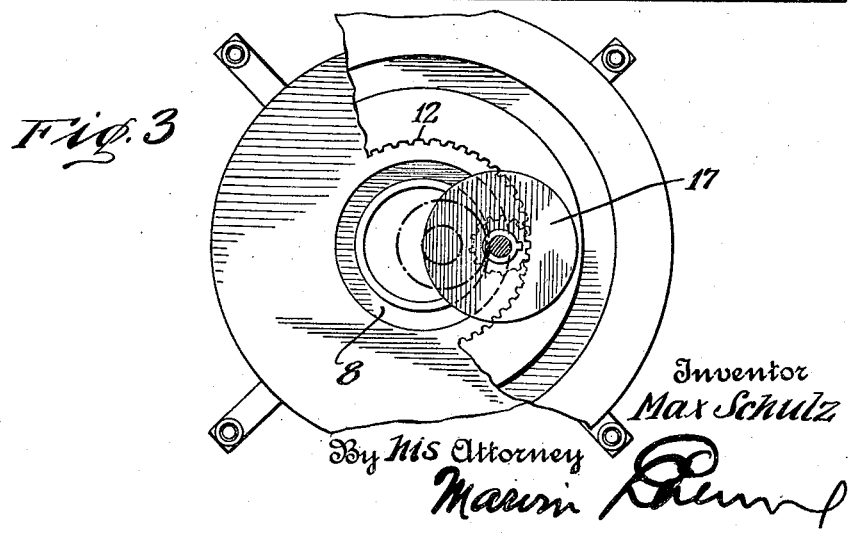
Figure 3 is a plan view of the device.

Referring to the drawings, a casing 4, supports a plate 5 by means of screws 7 encompassed by bushings 6. The plate 5 is provided with a circular groove 8 in which rides a pin 9, and the casing 4 is provided with a similar groove in which rides a pin 10, the pins 9 and 10 being fixed to a gear 11, which meshes with the integral gear 12, which is supported between the casing and the plate 5 by the ball bearings 13. The outer edge of the gear 12 is provided with a gear 14, meshing with a bevel gear 15 fixed to the drive shaft of an electric motor.

Carried by gear 11 is a flat circular cutting knife 17, and it will be seen that movement of gear 12 will cause gear 11 to rotate and travel along the gear 12, carrying the knife 17 with it.

When it is desired to cut a cigar, the end of the cigar is inserted through the aperture 18 in the casing 4, and the motor 16 started. The revolving knife 17 will then effectively and properly cut the end of the cigar without necessitating resort to manual means of any kind.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to protect by Letters Patent, is:

1. A cigar cutting device, comprising a casing, a plate supported by the casing, said plate having a circular groove, a pin movable in said groove, a gear fixed to the pin, an internal gear meshing with said gear, a circular knife fixed to the gear and rotatable therewith, a bevel gear formed on the outer circumference of the internal gear, a bevel gear meshing with the first mentioned bevel gear, a shaft upon which the last mentioned bevel gear is fixed, and an electric motor to drive the shaft.

2. A cigar cutting device, comprising a casing, a plate supported by the casing and having a circular groove, a pinion having a pin fixed thereto, said pin being movable in the groove in the plate, an internal gear meshing with said pinion, a circular knife fixed to the pinion, and an aperture in the casing through which the ends of cigars may enter to engage the knife, and means operated by an electric motor to rotate the internal gear.

In witness whereof I have signed my name to this specification.

MAX SCHULZ.